United States Patent

[11] 3,608,779

| [72] | Inventor | Richard T. Cornelius<br>Minneapolis, Minn. |
|---|---|---|
| [21] | Appl. No. | 783,302 |
| [22] | Filed | Dec. 12, 1968 |
| [45] | Patented | Sept. 28, 1971 |
| [73] | Assignee | The Cornelius Company<br>Anoka, Minn. |

[54] METHOD AND APPARATUS FOR PRODUCING AND DISPENSING A SEMIFROZEN CARBONATED BEVERAGE
15 Claims, 3 Drawing Figs.

| [52] | U.S. Cl. | 222/54 |
|---|---|---|
| [51] | Int. Cl. | B67d 5/08 |
| [50] | Field of Search | 222/54, 146 C, 129.1, 146; 62/69, 70; 262/140; 261/DIG. 7, 119; 99/79 |

[56] References Cited
UNITED STATES PATENTS

| 3,209,952 | 10/1965 | Cornelius | 222/146 X |
|---|---|---|---|
| 3,256,100 | 6/1966 | Bernstein et al. | 62/69 X |
| 3,468,137 | 9/1969 | Welty | 62/69 |
| 3,479,835 | 11/1969 | Lane et al. | 62/69 X |

*Primary Examiner*—Samuel F. Coleman
*Attorney*—Hill, Sherman, Meroni, Gross & Simpson

ABSTRACT: Water, syrup, and carbon dioxide gas are combined after precooling the liquids in a refrigerated carbonator, operating at a first static pressure, and thence conducted through a pressure regulator valve to a freezing chamber operating at a lower static pressure where the product is converted into a slush type of beverage under temperature and pressure conditions such that free carbon dioxide gas will be diffused throughout the product which is saturated with $CO_2$ gas in solution. Temperature in the carbonator is used to regulate the carbonating pressure.

INVENTOR.
RICHARD T. CORNELIUS

METHOD AND APPARATUS FOR PRODUCING AND DISPENSING A SEMIFROZEN CARBONATED BEVERAGE

BACKGROUND OF THE INVENTION

1. Field of the Invention

This invention relates to a method and means for producing and dispensing a semifrozen carbonated beverage.

2. Prior Art

In prior machines and methods, a high overrun has been attainable only by freezing out a relatively high percentage of ice, whereby several problems have ensued. Prior machines have operated with rather high product viscosity and the resultant power and structural requirements have proven to be demanding. Ice balling or ice agglomeration of the stirrer shaft becomes an extreme problem at higher percentages of ice in the product. Further, the refrigeration requirements have been very high for a drink of high percentage of ice content, whereby the capacity to produce a relatively large number of drinks in a given period of time is reduced.

SUMMARY OF THE INVENTION

In this invention, the operating parameters are controlled so that the product in the freezing chamber tends to be more than fully saturated with carbon dioxide gas, whereby carbon dioxide gas breaks out of the liquid phase to produce a dispersion of free gas bubbles throughout the stirred product, rendering the same foamy to some degree within the freezing chamber. To this end, a storage source of carbonated beverage such as a carbonator is preferably refrigerated at a first static pressure and is frozen in the freezing chamber at a reduced static pressure controlled by a regulator valve. A further regulator valve controls the pressure in the storage source of carbonated beverage in response to the temperature thereof. By admixing water and syrup before refrigeration thereof, such refrigeration can be to a lower level as the syrup serves to depress the freezing point of the mixture.

Accordingly, it is an object of the present invention to provide a method and apparatus for producing and dispensing a semifrozen carbonated beverage where a high degree of overrun is assured.

Another object of the present invention is to provide a method and apparatus whereby a high degree of efficiency of operation is obtained.

Another object of the present invention is to provide a high overrun in an easy manner.

A still further object of the present invention is to provide a high overrun using less ice and hence less refrigeration, less cycling of the refrigeration equipment, and hence lesser power costs, longer equipment life, and the like.

A still further object of the present invention is to reduce the viscosities and thereby to lower scraping and other structural loads within the freezing chamber.

A still further object of the present invention is to decrease refrigeration requirements per drink, whereby the capacity of the machine is increased.

A still further object of this invention is to eliminate the ice balling or agglomeration problem.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

ON THE DRAWINGS

AS SHOWN ON THE DRAWINGS

Figure 1:
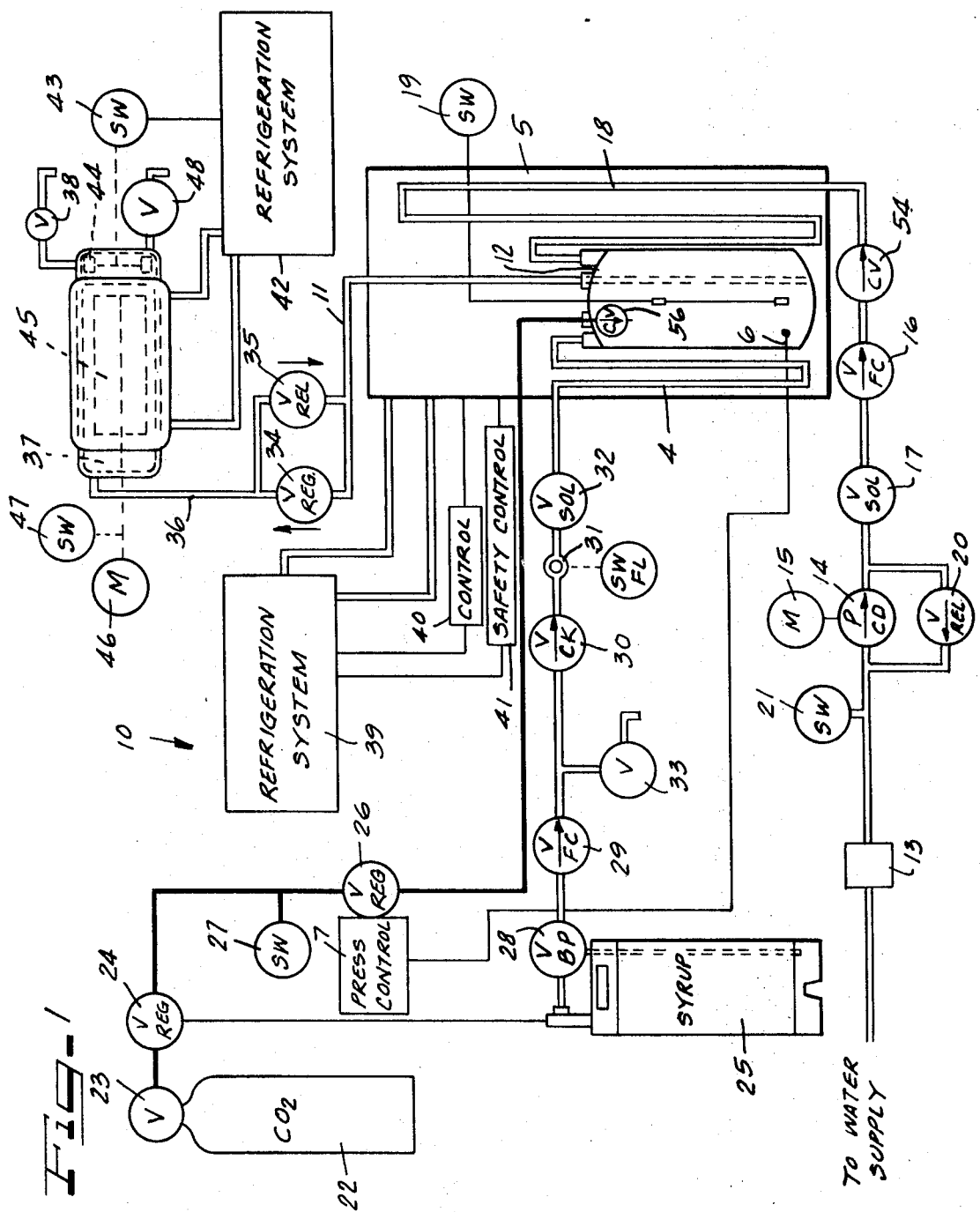
FIG. 1 is a diagrammatic view of a system for producing and dispensing a semifrozen carbonated beverage embodying the method and apparatus of the present invention.

The principles of the present invention are particularly useful when embodied in a method and apparatus for producing and dispensing a semifrozen carbonated beverage such as shown in FIG. 1, generally indicated by the numeral 10. A sugar-containing beverage is to be produced and dispensed as a slush type of beverage, the dispensed product having a high degree of overrun. The term "overrun" has been derived by analogy from the ice cream field, and in the slush-beverage field, refers to the extent that the volume of the served beverage has increased over the initial volume prior to refrigeration. This expansion in volume is primarily due to the presence of carbon dioxide gas bubbles, and to a very minor extent, due to actual expansion of product. Reliability in degree of overrun has been an industry problem which the present invention, among other problems described above, solves. The apparatus 10 may be utilized in accordance with various methods described below by means of various examples. In order to produce the semifrozen carbonated beverage, there is initially provided through a fluid conduit or product line 11 a suitable preliminary product having the desired amount of carbonation and degree of sweetness. Such preliminary product is obtained from a storage source of carbonated beverage, here illustrated as being a carbonator-blender 12. It is to be understood that in accordance with certain aspects of the present invention, such storage source may comprise a conventional premix transfer tank containing such preliminary beverage. (A syrup transfer tank 25 described below is an example of the physical construction of such premix tank).

The carbonator-blender 12 is provided with water, syrup and carbon dioxide gas which is obtained from appropriate sources, and by means of such gas, the storage source of carbonated beverage 12, whether it be a carbonator or a premix tank, is provided with a first static pressure as is presently explained, at a pressure level given in various examples below. In the illustrated example, water passes through a filter 13 and is then transferred by a constant delivery pump 14 driven by a motor 15 to the carbonator-blender 12 via a check valve 54 at a rate controlled by a flow control valve 16 whenever a solenoid valve 17 is energized. The valve 17 is controlled by a switch 19 which is responsive to the quantity of product in the carbonator-blender 12. A relief valve 20 protects the pump 14, and a pressure switch 21 is held closed by the presence of water pressure coming from the water mains, the switch being connected in circuit to shut down the apparatus 10 in event of water failure.

Carbon dioxide gas is provided from a tank 22 having a conventional valve 23 leading to a pressure regulator 24 which delivers carbon dioxide gas to a syrup transfer tank 25 and to a secondary pressure regulator 26 and by which regulator the carbonator-blender 12 or premix tank is also charged with carbon dioxide gas. A pressure switch 27 is provided in the carbon dioxide line as a safety switch to shut down the apparatus in the absence of a preselected minimum gas pressure.

The syrup is forced out of the tank 25 by carbon dioxide gas pressure and passes through an optional bypass valve 28, thence through a manually adjustable flow control valve 29, a check valve 30, a float switch 31, and a solenoid valve 32 and thence to the carbonator-blender 12 through an internal snifter valve 56. The snifter valve 56 is a check valve which passes gas in either direction but will not permit liquid flow in a reverse direction, and is of known construction. The flow control valve 29 is manually set to provide the desired ratio of water to syrup. TO know the amount of syrup being transferred per unit time, there is provided a sampling valve 33 which may be manually opened so that samples of syrup can be manually withdrawn into a graduate for a fixed period of time.

The check valve 30 prevents any possible backup of diluted syrup while the float switch 31 permits the apparatus to operate only so long as syrup is present at that point. THe syrup solenoid valve 32 and the pump motor 15 are also under the control of the fill-control switch 19.

The pressure controlled by the secondary pressure regulator 26 not only serves as the carbonating pressure, but also serves to propel the product through the fluid conduit 11 which includes a pressure-reducing regulator valve 34, through a line 36 to a freezing chamber 37. The regulator valve 34 is set at a lower pressure setting to provide a second static pressure which is less than the first static pressure in the carbonator-blender 12, the second static pressure being present in the freezing chamber 37. A relief valve 35 is connected across the regulator valve 34. In the vent of a heavy draw of product from the freezing chamber 37, and also at the time of initial filling and cooling, product expansion is thus permitted in a rearward direction through the relief valve 35, thereby protecting the integrity of the system. The freezing chamber 37 is provided with a manual vent valve 38 which enables complete filling of the chamber 37 with the product. In this embodiment, the water supply passes through a water precooling coil 18, and the syrup passes through a syrup precooling coil 4, the precooling coils 4, 18 and the carbonator 12 being jointly disposed in a cooling device 5 to be refrigerated. As the product ingredients are transferred from an ambient temperature zone, they become cooled by the precooling coils 4, 18, the temperature of which is determined by a refrigeration system 39 which has a temperature control 40. The sugar in the product serves as antifreeze, but if there should be some type of failure as to the amount of sugar present as described below or failure of the temperature control 40, a safety control 41 of a known type will indicate the presence of ice or the possibility that ice might be present in the cooling device 5.

The freezing cylinder having the freeing chamber 37 is refrigerated by a refrigeration system 42 of high capacity, there being one such refrigeration system for each freezing chamber 37. The refrigeration system 42 is under the control of a switch 43 which is responsive to a condition of the product in the chamber 37. For example, the switch 43 can be mechanically actuated by a viscosity-sensing element 44 of a known type.

As ice begins to form in the freezing chamber 37, a continually rotating stirrer-scraper 45 removes it from the interior walls of the freezing chamber, he stirrer-scraper being driven by a continually operating motor 46. If for any reason stirrer rotation should terminate, such termination is sensed by a centrifugal switch 47 which is connected in series with the switch 43 to shut down the refrigeration system 42. Prepared semifrozen product is withdrawn from the chamber 37 by means of a dispensing valve 48 which is manually actuated in a manual system, or which is electrically actuated in the instance of an automatic or coin-operated system.

The sugar present in the syrup of the beverage serves as antifreeze, and hence any palatable sugar-substitute which also serves to depress the freezing point of water is an equivalent. Examples of equivalents include alcohol and glycerine, while presently known artificial sweeteners are not equivalent as they do not depress the freezing point of water. As the product begins to freeze, as it is a mechanical solution rather than a chemical solution, a proportion of the water component is eventually frozen out. As this water becomes frozen, it gives up the sugar and the carbon dioxide gas that was in solution with it, and such sugar is readily reabsorbed by the remaining liquid phase. As to the gas, there is reabsorption only when the liquid phase is not saturated with carbon dioxide gas. However, in accordance with this invention, the operating parameters are so chosen that the remaining liquid phase will be at saturation before any drawing begins so that there is positively produced a surplus of free tiny gas bubbles which are dispersed throughout the freezing chamber by the stirring action of the stirrer 45. Although the stirring action is very gentle, it is possible that the physical agitation produced by the gentle stirring may render the liquid phase slightly unstable, so that the degree of saturation may be ever so slightly below that of full saturation. Thus, with the stirring, there is a degree of foaminess present within the freezing chamber 37, and on opening the dispensing valve 48, the free gas bubbles readily expand to produce a foamy drink, without necessarily having any significant break out of gas that is still in solution in the liquid phase. Thereby, overrun is positively and reliably obtained.

The temperature in the carbonator 12 may vary considerably. For example, such as at start up, it would be room temperature. It would also be at room temperature if the refrigeration system 39 were deliberately shut off. As the temperature of the carbonator 12 can vary, and as the amount of carbonation desired should not vary after it has been selected, to offset the variation in the amount of carbonation present in the product in the carbonator or other storage source of carbonated beverage, there is provided means responsive to the temperature of the beverage in such source to control the pressure regulator 26 to alter the pressure in the storage source as a function of temperature. Such means is here illustrated schematically by a sensing element 6 connected to a suitable control 7 for the pressure regulator 26. By way of example, the element 6 may be a capsule filled with liquid and connected by a capillary line to a bellows actuator in the control 7 for altering the spring biasing forces in the pressure regulator valve 26.

The refrigeration switch 43 for the refrigeration system 42 is so set that the system 42 is controlled to come on and to turn off in cycles such that for whatever temperature variation there is in the freezing chamber 37 per refrigeration cycle, free gas bubbles will always be present in the semifrozen product.

Figure 3:
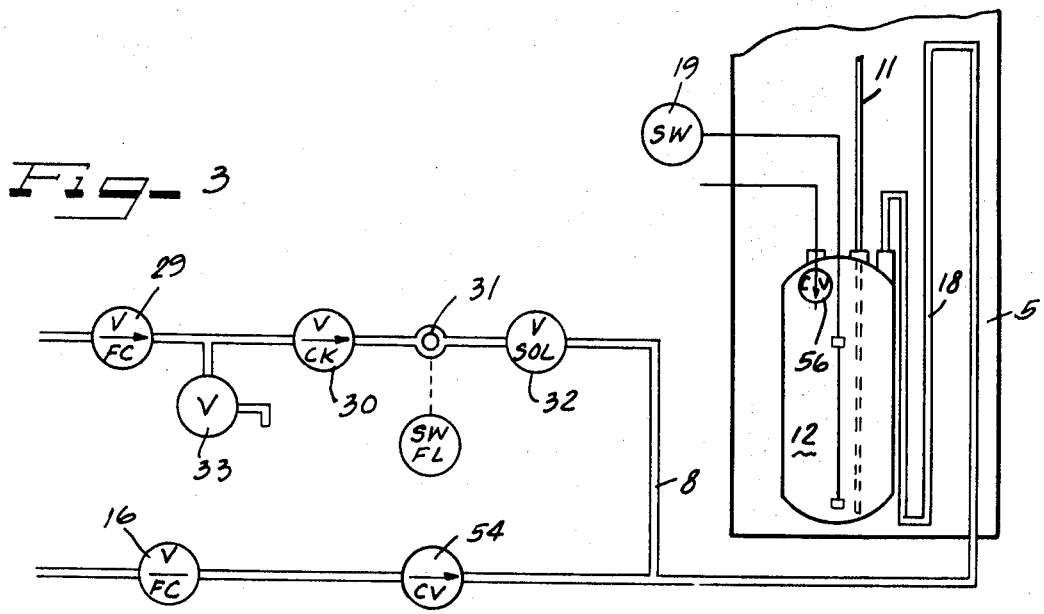
FIG. 3 is a fragmentary view of a modification to the system of FIG. 1.

In the modification of FIG. 3, the syrup precool line 4 has been omitted, and a line 8 has been provided to connect the source of syrup to the water precool coil 18 to lower the freezing point of the water before the precool coil is subjected to any cooling by the cooling device 5. Thus, the syrup and the water are blended prior to any refrigeration to lower the upper freezeout point a few degrees before refrigeration, thereby enabling the cooling device 5 to refrigerate the water-syrup mixture to a lower temperature without danger of freezing, and thereby also enabling the carbonator 12 to be cooled by the cooling device 5 to a lower temperature and hence to obtain a greater amount of carbonation.

The apparatus 10 of FIG. 1 or of FIG. 3 thus is constructed to practice the steps of storing a carbonated beverage at a pressure and temperature where the degree of carbonation in the beverage is that of saturation. Thereafter, the carbonated product is transferred to a freezing chamber operating under pressure and temperature conditions which enable the production of ice, the freezing continuing until there is a surplus of free carbon dioxide gas, preferably at a lesser pressure. In other words, there is a tendency for the liquid phase to be supersaturated in the freezing chamber 35, but owing to the stirring action of the stirrer 45, this cannot take place, and therefore free gas particles are dispersed through the liquid phase. Thus when the foamy product in the freezing chamber 37 is withdrawn, the free gas particles, which are a feature of such foamy product, expand because of further pressure reduction and a high degree of overrun is reliably obtained.

Figure 2:
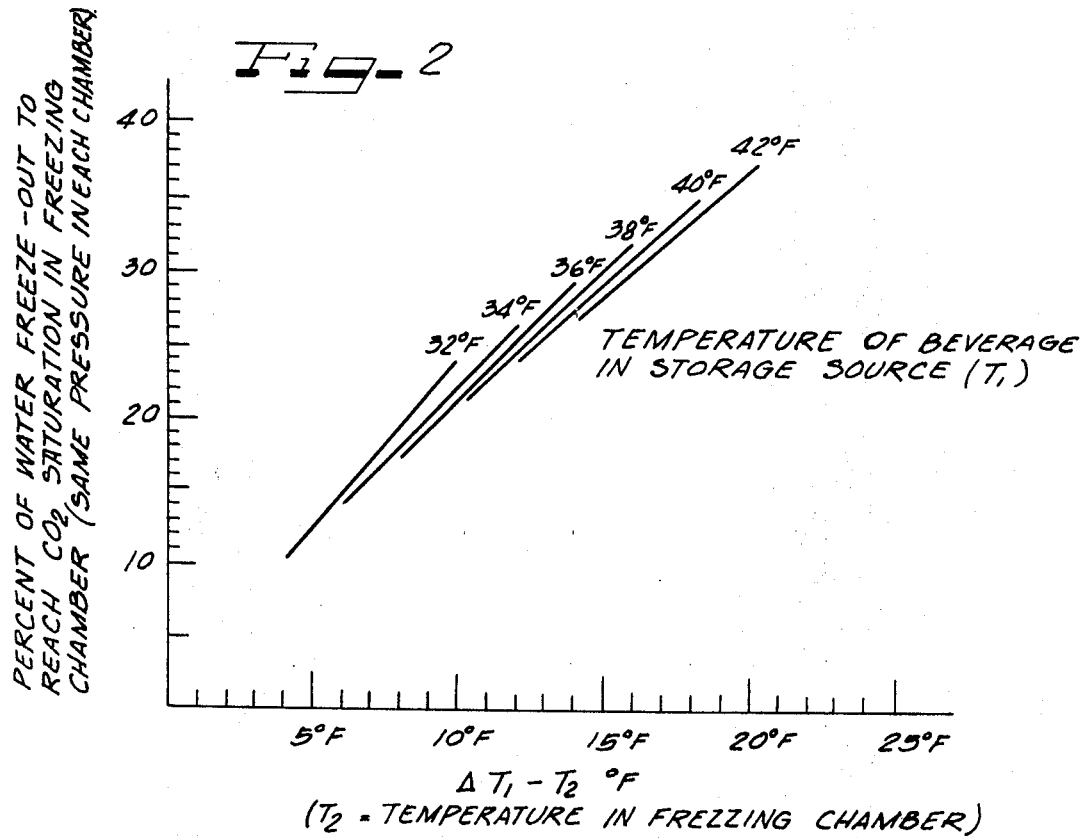
FIG. 2 is a chart illustrating certain relationships between parameters applicable to this art.

The chart of FIG. 2 illustrates the operation of this apparatus with the regulator valve 34 so set that the pressure in the freezing chamber 37 is equal to the pressure in the carbonator 12. This equality of pressure is also obtained if the pressure regulator 34 were removed. It has been stated that this invention teaches the release of free carbon dioxide gas in the freezing chamber 37 due to freezing while the remaining liquid phase is saturated for the temperature and pressure existing. This chart illustrates limiting values above which the apparatus should be operated so as to produce this desirable condition. The numerals along the left side of the chart denote the percentage of water that must be frozen out of the carbonated beverage in order for the remaining liquid phase to be saturated with carbon dioxide. This percentage presumes that the pressure in the freezing chamber 37 is equal to the carbon dioxide pressure in the carbonator 12. Further, it should be kept in mind that the carbonator 12 discharges product that is saturated with carbon dioxide gas for such pressure and temperature. However, the lowering of the temperature of the product in the freezing chamber renders the product nonsaturated with $CO_2$ gas, but the degree of saturation is increased where sufficient water is frozen out. The temperature scale across the bottom of the chart denotes the temperature difference between the beverage in the carbonator ($T_1$) and the temperature in the freezing chamber 37 ($T_2$). The temperatures identified for each of the individual graph lines are the temperatures of the beverage in the carbonator or source 12. Consider the uppermost line first. With the product temperature in the carbonator 12 being at 42° F. and with the freezing chamber being maintained at a temperature about 14° colder, it is necessary to freeze out about 27 percent of the water for the remaining liquid phase to be saturated with carbon dioxide gas. Thus, a higher percentage of water must be frozen out to assure the presence of the free carbon dioxide gas bubbles in the freezing chamber. On the other hand, if the freezing chamber is maintained at a temperature of 20° F., about 37 percent of the water must be frozen out to reach such saturation. With lower product temperatures in the carbonator, a greater amount of $CO_2$ gas will be absorbed, and hence saturation will be more easily reached by the freezing chamber. With the apparatus of FIG. 1, the cooling device 5 must not be operated at a temperature so low that there is a danger of freezing the water in the water precool line 18. If the control 40 is then set to operate at about 37° F. nominally, it may be assumed that the temperature will cycle in the range between 34° and 40° F. A lower nominal setting might thus be unsafe. With reference to the chart, the 34°, 36°, 38° and 40° F. lines would thus define limits above which the apparatus must be operated in order to obtain saturation in the freezing chamber.

The modification of FIG. 3 can operate in a more advantageous manner in this regard. While a temperature of 32° F. is absolutely the lowest temperature that the cooling coil 18 can be subjected to in the form of FIG. 1, owing to the presence of the freezing point depressant in the form of sugar, in the water cooling coil 18 of FIG. 3, the coil can be subjected to a lower temperature. According to the best information available, the first freezing of product will begin at a temperature between 28.5° and 29.0° F. Therefore, the cooling device 5 can be operated at a temperature 3° F. lower than can the form of FIG. 1. Doing so shifts the mean operating temperature of 37° F. described above (which would be about midpoint in the chart) to near the lowest line on the chart, whereby a very dramatic further improvement is provided in that lower percentages of water need to be frozen out to reach saturation.

In accordance with this invention, the product, prior to reaching the freezing chamber 37, is carbonated to a level which is in excess of the ultimate saturation level after preparation in the freezing chamber 37 such that during preparation in the freezing chamber, excess $CO_2$ gas is forcibly expelled from the solution within the product and the product becomes of foamy consistency while yet within the freezing chamber. The level to which the product is initially carbonated or the level of carbonation at which the product is furnished is of course dependent upon temperature and pressure as is well known. For example, as at start up, or if the refrigeration system 39 were shut down, or if the storage source 12 were a premix tank at room temperature, with a temperature of 70° F. and a carbonation level of 3 volumes of $CO_2$ gas dissolved in the liquid, a pressure of about 37 p.s.i. of $CO_2$ gas would be needed to maintain such carbonation in a stable manner. As the temperature decreases, corresponding lesser pressures would be needed, and as lesser levels of carbonation are desired, corresponding pressure reductions are also made.

EXAMPLE 1

Assume an average temperature of 37° F. for the carbonator 12 and a temperature of 26° F. for the freezing chamber 37. Further, assume that the pressure is the same in the freezing chamber 37 as in the carbonator 12, and an arbitrarily selected pressure of 30 p.s.i.g. The saturation level in the carbonator is 4.7 volumes while the saturation level in the freezing chamber 37 is theoretically 6.0 volumes. Thus, the carbonation at saturation at a temperature of 37° F. is 78 percent of that at a temperature of 26° F. When 22 percent (100 minus 78) of the liquid in the freezing chamber has been frozen, the gas which such freezing released is absorbed in the remaining liquid phase bringing its level up to saturation. As freezing continues above 22 percent, the liquid portion becomes reduced in volume and $CO_2$ gas is forcibly expelled from the solution to create the foamy mixture within the cylinder.

EXAMPLE 2

If a pressure of 20 p.s.i.g. is arbitrarily selected for the freezing chamber 37, which is again assumed to be operating at the temperature 26° F., the liquid portion will theoretically hold about 4.7 volumes of carbon dioxide gas. To duplicate the 22 percent freezeout figure of the previous example, initial carbonation of 3.7 volumes is required (78 percent of 4.7 volumes). To obtain such 3.7 volumes of gas in the initial product, if the product temperature is 70° F., a carbon dioxide gas pressure of 48 p.s.i.g. is needed. If the temperature in the carbonator or premix tank were 60° F., a $CO_2$ gas pressure of 40 p.s.i.g. would be needed. These source pressures are provided by the regulator 26 while the 20 p.s.i.g. pressure in the freezing chamber 37 is provided by the regulator 34.

EXAMPLE 3

If example 1 were modified to have higher temperatures in the source of carbonated beverage such as the carbonator 12 or premix tank, while retaining the parameters of example 1 for the freezing chamber 37, the regulator 34 would be set to maintain the 30 p.s.i.g. in the freezing chamber 37, while the regulator 26 would need to be set to be 64 p.s.i.g. and 54 p.s.i.g. for temperatures of 70° F. and 60° F. respectively. Thus the high pressures required on the source of carbonated beverage, particularly if it is a noncooled or little-cooled product, make a low-freezing chamber pressure desirable.

The pressure in the freezing chamber 37 is selected on the basis of how much carbon dioxide gas is desired in solution in the liquid portion of the semifrozen beverage. The carbonation maintaining or producing pressure is adjusted in consideration of the final desired carbonation of the liquid phase. The degree of overrun is then adjusted by freezing more or less ice in the beverage. If extremely high overrun is desired without freezing out relatively high percentages of ice, such can be attained by using very large pressure differentials between the storage source of carbonated beverage 12 and the freezing chamber 37. Thus, there is a compounding of the benefits obtained by use of a refrigerated source with the benefits obtained by use of the pressure drop obtained by the regulator 34. The use of means responsive to temperature of beverage in the source 12 to control the pressure regulator 26 to alter the pressure in the storage source as a function of temperature has the effect of obtaining a consistent freezeout percentage of water in reaching the saturation level of the remaining liquid phase in the chamber 37.

With the pressure in the source 12 and the pressure in the freezer chamber equal, the freezout figures given in FIG. 2 are constant for all carbonation pressures.

By the foregoing method and apparatus, the advantages and objects set forth above are obtained. One of the most important and unexpected results obtained is the solution to the ice ball problem. With the excess free carbon dioxide gas in the cylinder, ice balling on the stirrer shaft is no longer evident. The exact cause for this result is unknown. It may be that motion of the beverage due to stirrer action is more abrupt causing ice agglomerations to breakup. It may also be that since the ice is more dense than the foamy mixture, more ice may tend to move away from the stirrer shaft while the liquid having the free gas is of lower density so that possibly something like a gas ring is formed around the stirrer shaft. Then as the ice is the next least dense material in the product, when it contacts the shaft, there may be a lessened likelihood of such contact or a shearing impact that tends to knock off any ice deposits thereon. No matter what the theory of operation is, the elimination of ice balling nevertheless is an important unexpected result that is obtained.

Although various minor modifications might be suggested by those versed in the art, it should be understood that I wish to embody within the scope of the patent warranted hereon all such embodiments as reasonably and properly come within the scope of my contribution to the art.

I claim as my invention:

1. Apparatus for producing and dispensing a semifrozen carbonated beverage, comprising:
   a. a storage tank of carbonated beverage arranged to be continually pressurized with carbon dioxide gas to a first static pressure;
   b. a freezing cylinder having a chamber for freezing a quantity of said beverage therein as a semifrozen slush;
   c. a dispensing valve connected to said freezing cylinder;
   d. a single fluid conduit connected between said storage tank and said freezing cylinder for transferring all the gas and beverage thereto, and including a single pressure-reducing regulator valve for controlling said transferring and for hydrostatically applying a substantially constant second static pressure in said freezing cylinder when said dispensing valve is closed which is less than said first static pressure.

2. Apparatus for producing and dispensing a semifrozen carbonated beverage, comprising:
   a. a storage source of carbonated beverage arranged to be pressurized with carbon dioxide gas to a first static pressure;
   b. a freezing cylinder having a chamber for freezing a quantity of said beverage therein as a semifrozen slush;
   c. a dispensing valve connected to said freezing cylinder;
   d. a single fluid conduit connected between said storage source and said freezing cylinder for transferring all the gas and beverage thereto, and including a pressure-reducing regulator valve for controlling said transferring and for hydrostatically applying a substantially constant second static pressure in said freezing chamber when said dispensing valve is closed which is less than said first static pressure; and
   e. a relief valve connected across said regulator valve to relive a predetermined excess pressure buildup in said freezing chamber due to beverage expansion, back to said storage source, with said regulator valve closed.

3. Apparatus for producing and dispensing a semifrozen carbonated beverage, comprising:
   a. a storage source of carbonated beverage;
   b. a freezing cylinder having a chamber for freezing a quantity of said beverage therein as a semifrozen slush;
   c. a dispensing valve connected to said freezing cylinder;
   d. a fluid conduit connected between said storage source and said freezing cylinder for transferring carbonated beverage thereto;
   e. a pressure regulator arranged to pressurize said storage source with a static pressure of carbon dioxide gas; and
   f. means responsive to the temperature of carbonated beverage in said storage source and connected to control said pressure regulator for altering said static pressure in said storage source as a function of said temperature.

4. Apparatus for producing and dispensing a semifrozen carbonated beverage, comprising:
   a. a carbonator-blender arranged to be connected to sources of water, syrup and carbon dioxide gas for providing and mixing all the ingredients of the carbonated beverage;
   b. a first refrigeration system acting on the entire carbonator-blender to remove heat therefrom, and responsive to the temperature thereof;
   c. a freezing cylinder having a chamber for freezing a quantity of said beverage therein as a semifrozen slush;
   d. a single fluid conduit connected between said carbonator-blender and said freezing cylinder for transferring carbonated beverage thereto;
   e. a second refrigeration system independent of said first refrigeration system and acting on said cylinder to remove heat therefrom for effecting said freezing, and responsive to the consistency of the beverage therein; and
   f. a dispensing valve connected to said freezing cylinder.

5. Apparatus for producing and dispensing a semifrozen carbonated beverage according to claim 4, including a precooling syrup coil for connecting the source of syrup to said carbonator-blender and disposed in heat-transfer relation to said first refrigeration system to be cooled thereby.

6. Apparatus for producing and dispensing a semifrozen carbonated beverage according to claim 4, including a pair of precooling coils for respectively connecting the sources of syrup and water to said carbonator-blender and both disposed in heat-transfer relation to said first refrigeration system to be cooled thereby.

7. Apparatus for producing and dispensing a semifrozen carbonated beverage, comprising:
   a. a carbonator-blender arranged to be connected to sources of water, syrup and carbon dioxide gas for providing and mixing all the ingredients of the carbonated beverage;
   b. a first refrigeration system acting on said carbonator-blender to remove heat therefrom;
   c. a precooling coil for connecting the source of water to said carbonator-blender and disposed in heat-transfer relation to said first refrigeration system;
   d. a line connecting the source of syrup to said water precooling coil at a point upstream of said first refrigeration system for depressing the freezing point of the water before it is subjected to said heat transfer;
   e. a freezing cylinder having a chamber for freezing a quantity of beverage therein as a semifrozen slush;
   f. a single fluid conduit connected between said carbonator-blender and said freezing cylinder for transferring carbonated beverage thereto;
   g. a second refrigeration system acting on said cylinder to remove heat therefrom for effecting said freezing; and
   h. a dispensing valve connected to said freezing cylinder.

8. A method for producing and dispensing a semifrozen carbonated beverage, comprising:
   a. storing a quantity of carbonated beverage under such a static pressure of carbon dioxide gas and at such a temperature that the degree of carbonation is substantially at saturation and the level of carbonation is stable;
   b. transferring a portion of said carbonated beverage to a freezing chamber where the same is maintained under static pressure;
   c. freezing a proportion of water out of the beverage in the chamber whereby carbon dioxide gas is released from the water which is becoming the solid phase and is absorbed by the remaining liquid phase;
   d. continuing such freezing until more free gas has been so released than can be absorbed by the liquid phase, while stirring the mixture to disperse said free gas throughout the liquid phase; and
   e. withdrawing a serving of the beverage mixture from the chamber, whereby said more gas insures a foamy serving.

9. A method for producing and dispensing a semifrozen carbonated beverage according to claim 8, wherein said static pressure in said freezing chamber is less than said static pressure during said storing.

10. A method for producing and dispensing a semifrozen carbonated beverage according to claim 8, wherein the static pressure and the ultimate temperature in the freezing chamber, for any selected magnitude of said proportion, are such that the degree of carbonation tends to be greater than saturation for the amount of carbon dioxide gas initially present.

11. A method for producing and dispensing a semifrozen carbonated beverage according to claim 8, including
   a. refrigerating syrup to a temperature near just above 32° F.; and
   b. blending the refrigerated syrup, water and carbon dioxide gas to provide said quantity being stored.

12. A method for producing and dispensing a semifrozen carbonated beverage according to claim 8, including controlling said freezing in on-and-off cycles such that the freezing is periodically reinitiated and terminated with said released free gas always present.

13. A method for producing and dispensing a semifrozen carbonated beverage, comprising:
   a. storing a quantity of carbonated beverage;
   b. applying a static pressure of carbon dioxide gas to said stored quantity;
   c. sensing the temperature of the stored quantity of carbonated beverage;
   d. altering said static pressure of carbon dioxide gas as a function of the sensed temperature;
   e. transferring a portion of said quantity of carbonated beverage to a freezing chamber;
   f. freezing a proportion of the water out of the beverage in the chamber while under pressure; and
   g. withdrawing a serving of the beverage from the chamber.

14. A method for producing and dispensing a semifrozen carbonated beverage according to claim 13 in which said storing of the carbonated beverage is under such a static pressure of carbon dioxide gas and is at such a temperature that the degree of carbonation is substantially at saturation and the level of carbonation is stable, in which the transferred portion in the freezing chamber is under static pressure such that carbon dioxide gas released from the water which is becoming the solid phase is absorbed by the remaining liquid phase, and in which such freezing is continued until more free gas has been so released than can be absorbed by the liquid phase, while stirring the mixture to disperse said free gas throughout the liquid phase, whereby said more gas insures a foamy serving.

15. A method for producing and dispensing a semifrozen carbonated beverage, comprising:
   a. combining water, syrup and pressurized carbon dioxide gas in a carbonating and blending chamber to provide a stored quantity of the carbonated beverage;
   b. refrigerating the syrup before it enters said carbonating and blending chamber;
   c. refrigerating said chamber during carbonation and storage of said beverage in response to temperature;
   d. transferring a portion of said quantity of carbonated beverage to a freezing chamber;
   e. freezing a proportion of the water out of the beverage in the freezing chamber while under pressure in response to beverage consistency; and
   f. withdrawing a serving of the beverage from the freezing chamber.